United States Patent
Alur et al.

(10) Patent No.: US 8,321,792 B1
(45) Date of Patent: Nov. 27, 2012

(54) METHOD AND SYSTEM FOR CAPTURING AND USING MASHUP DATA FOR TREND ANALYSIS

(75) Inventors: Deepak Alur, Fremont, CA (US); Kishore Subramanian, Sunnyvale, CA (US); Rajmohan Krishnamurthy, Walnut Creek, CA (US)

(73) Assignee: JackBe Corporation, Chevy Chase, MD (US)

( * ) Notice: Subject to any disclaimer, the term of this patent is extended or adjusted under 35 U.S.C. 154(b) by 204 days.

(21) Appl. No.: 12/763,798

(22) Filed: Apr. 20, 2010

Related U.S. Application Data

(60) Provisional application No. 61/171,382, filed on Apr. 21, 2009.

(51) Int. Cl.
*G06F 3/00* (2006.01)
(52) U.S. Cl. .......................... 715/742; 715/764
(58) Field of Classification Search .................. 715/742, 715/764
See application file for complete search history.

(56) References Cited

U.S. PATENT DOCUMENTS

| | | | |
|---|---|---|---|
| 6,119,135 A | 9/2000 | Helfman | |
| 6,674,447 B1 | 1/2004 | Chiang et al. | |
| 6,684,207 B1 * | 1/2004 | Greenfield et al. | 707/999.003 |
| 7,149,982 B1 | 12/2006 | Duperrouzel et al. | |
| 7,434,229 B2 | 10/2008 | Barinov et al. | |
| 7,536,413 B1 * | 5/2009 | Mohan et al. | 707/999.001 |
| 7,788,251 B2 * | 8/2010 | Carlson et al. | 707/707 |
| 7,831,559 B1 * | 11/2010 | Mohan et al. | 707/638 |
| 7,904,818 B2 | 3/2011 | Lauridsen et al. | |
| 2001/0028368 A1 | 10/2001 | Swartz et al. | |
| 2002/0178119 A1 | 11/2002 | Griffin et al. | |
| 2003/0117437 A1 | 6/2003 | Cook et al. | |
| 2003/0197726 A1 * | 10/2003 | Weitzman | 345/744 |
| 2004/0183831 A1 | 9/2004 | Ritchy et al. | |
| 2004/0221296 A1 | 11/2004 | Ogielski et al. | |
| 2005/0278323 A1 * | 12/2005 | Horvitz et al. | 707/5 |
| 2007/0067722 A1 | 3/2007 | Ames et al. | |
| 2007/0112955 A1 * | 5/2007 | Clemm et al. | 709/224 |
| 2007/0130541 A1 | 6/2007 | Louch et al. | |
| 2007/0162850 A1 | 7/2007 | Adler et al. | |
| 2007/0240063 A1 | 10/2007 | Cheng et al. | |
| 2007/0282673 A1 | 12/2007 | Nagpal et al. | |
| 2008/0016232 A1 | 1/2008 | Yared et al. | |
| 2008/0034314 A1 | 2/2008 | Louch et al. | |
| 2008/0215675 A1 | 9/2008 | Kaminitz et al. | |
| 2009/0157728 A1 | 6/2009 | Fletcher et al. | |
| 2009/0235285 A1 | 9/2009 | Kim et al. | |
| 2009/0265362 A1 | 10/2009 | Parsons et al. | |
| 2009/0328137 A1 | 12/2009 | Liang et al. | |

(Continued)

OTHER PUBLICATIONS

Tyler Close, "Web-key: Mashing with Permission," Hewlett-Packard Labs, (2008), presented on Apr. 21-25, 2008, Beijing, China, pp. 1-8.

(Continued)

*Primary Examiner* — Omar Abdul-Ali
(74) *Attorney, Agent, or Firm* — Posz Law Group, PLC

(57) ABSTRACT

A computer system includes a display interface, a user input device interface, and a processor cooperatively operable with the display interface and the user input device interface. The processor is configured to facilitate displaying, via the display interface, a mashup or service; interacting with the user to input, via the user input device interface, an indication to take a snapshot of the mashup or service being currently displayed via the display interface; and storing a snapshot artifact of live data from the mashup or service at the instant the snapshot is taken.

20 Claims, 4 Drawing Sheets

U.S. PATENT DOCUMENTS

2009/0328205 A1   12/2009  Ims et al.
2010/0042973 A1    2/2010  Anderson et al.

OTHER PUBLICATIONS

"Design pattern in simple examples," Jul. 5, 2007, http://www.go4expert.com/forums/showthread.php?t=5127, pp. 1-53.

Office Action mailed by the U.S. Patent Office on Dec. 30, 2011 in connection with related U.S. Appl. No. 12,763,724.

Office Action issued by the U.S. Patent Office on Jan. 9, 2012 in connection with related U.S. Appl. No. 12/763,517.

Office Action issued by the U.S. Patent Office on Jun. 8, 2012 in connection with related U.S. Appl. No. 12/763,582.

Office Action issued by the U.S. Patent Office on Aug. 8, 2012 in connection with related U.S. Appl. No. 12/763,517.

* cited by examiner

METHOD AND SYSTEM FOR CAPTURING AND USING MASHUP DATA FOR TREND ANALYSIS

CROSS-REFERENCE TO RELATED APPLICATIONS

This application claims the benefit of the following Provisional application: 61/171,382 filed Apr. 21, 2009, which is expressly incorporated herein by reference.

TECHNICAL FIELD

The technical field relates in general to computer networks, and more specifically to mashups and collecting data from mashups.

BACKGROUND

Mashups are known for obtaining live data from web services and providing the data to the user in a more flexible manner than conventional portals. Users of mashups interact with live data that continuously changes.

However, how do users understand the way data is changing or changed over time: When users interact with the same mashup periodically, they would like to be able to understand how the data changed or is changing on a periodic basis.

SUMMARY

Accordingly, one or more embodiments provide computer system. The computer system includes a display interface; a user input device interface; and a processor cooperatively operable with the display interface and the user input device interface. The processor is configured to facilitate displaying, via the display interface, a mashup or service. Also, the processor supports interacting with a user to input, via the user input device interface, a trend-tracking definition of trend-tracking data within a snapshot of the mashup or service being currently displayed via the display interface. The processor also supports generating the trend-tracking data from live data within the service or mashup on a pre-defined periodic basis, to collect the live trend-tracking data within the snapshot as defined by the trend-tracking definition.

Another embodiment further includes storing the trend-tracking definition in a trend-tracking database.

In still another embodiment, the trend-tracking definition includes a specification of a web service and which trend data available from the web service, to use as a source for the trend-tracking data.

Yet another embodiment aggregates the trend-tracking data over time, and analyzing a trend over time in the aggregated trend-tracking data.

According to still another embodiment, the snapshot with the trend-tracking data is stored as a reusable and shareable snapshot in a snapshot database.

A further embodiment provides for aggregating the trend-tracking data from plural different users.

In still another embodiment, the trend-tracking data is stored in the snapshot database within a snapshot and includes a timestamp, service or mashup identifier used for the mashup, copy of input data supplied to the mashup or service, copy of the trend-tracking data output from the mashup or service, and configuration information instructing the processor how to visualize and use the data in the snapshot.

Still other embodiments provide for a method for the foregoing, and/or a non-transitory computer-readable medium with instructions thereon which, when executed, perform the foregoing.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles.

DETAILED DESCRIPTION

Figure 1:
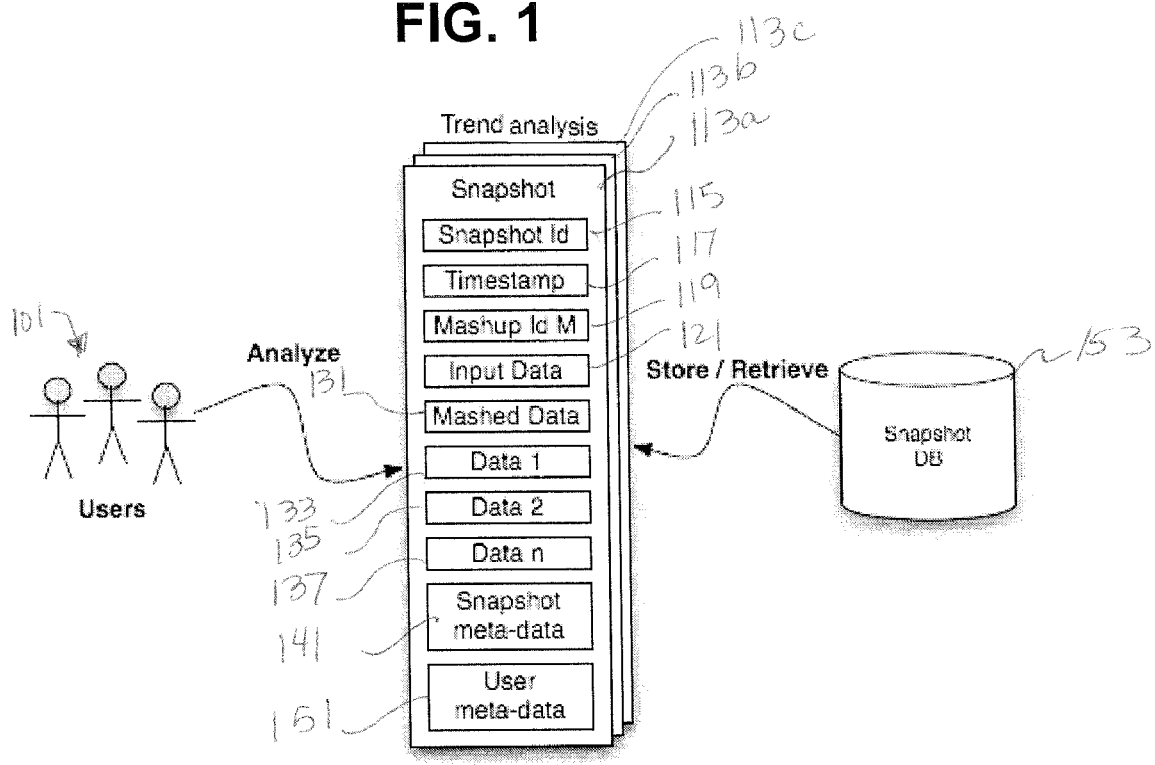
FIG. 1 is a block diagram illustrating a collection of snapshots used for trend analysis.

In overview, the present disclosure concerns computer systems, sometimes referred to as client/server networks, such as may be associated with computer systems providing mashups. Such computer systems often involve running a mashup on a user's computer that provides a user interface on the user's computer and that communicates as a client with a mashup server that invokes the desired web service specified by the mashup, the web service providing live data through the mashup client/server, so that the live data can be used according to the mashup without regard to user interface formatting specified by the web service. More particularly, various inventive concepts and principles are embodied in systems, devices, and methods therein for collecting live data from mashups, and retrieving and/or sharing the collected data.

The computer systems of particular interest are those providing or facilitating mashups over communication networks involving a mashup server and a user's computer, and the like, and variants or evolutions thereof.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to be able to capture, reuse, annotate, share, and analyze mashup data for collective intelligence and user-generated knowledge and trend analysis. This can allow users to perform trend analysis of mashup data by looking at a collection of data that has been periodically collected by the user and/or by the system. Once such data captured on a periodic basis and can be accessed by authorized users any time, then knowledge workers can have the ability to perform data trend analysis to understand the changes and there by provide better decision making abilities.

It is envisioned that this can facilitate easier and powerful ways to analyze mashup data by means of trend analysis and also by means of capturing user knowledge related to the data instantaneously.

An embodiment can conveniently be used in connection with the PRESTO™ Enterprise Mashup Platform product available from JackBe Corporation.

The term "snapshot" generally refers to a data set including a unique service identifier, "input data" (the inputs supplied by the invoking user or the invoking mashup to the service), and live data provided from the service that is captured at a single moment in time. The unique service identifier, input data, and live data alone can be used to later retrieve the mashup at that single (previous) moment in time. A snapshot can be uniquely identified by the time it was captured and the inputs supplied by the invoking user or invoking mashup to the service or mashup. The output thus obtained can be stored along with the meta-data associated with the output data. The meta-data can be system generated or user entered inputs to enrich information about the snapshot based on user knowledge of the domain of the mashup or service and the data. For instance, a user who is browsing a service or a mashup and invokes it by providing certain input(s) and therefore obtaining certain output(s) can decide to store the data as a snapshot. In doing so, the user may provide additional information such as: a description, a set of tags (folksonomy), annotations and comments, and other similar information, which can be stored with the snapshot artifact.

The system can store a snapshot as a reusable and shareable snapshot artifact in a specially designed snapshot database. Once stored, the snapshot artifact, that is, a snapshot and the related meta-data can be retrieved at any time, such as by a user with appropriate credentials and permissions. The term "snapshot artifact" as used herein is specifically defined herein below.

A snapshot can have a unique url address and can be retrieved by the user at any point in time.

Some versions hereof provide for sharing snapshots. In some versions, a snapshot can be shared with other users on an individual basis, or with groups of users. It can also be shared publicly for non-users of the systems to see; this can be useful to publish information to public-facing online and mobile destinations.

The snapshot system can include, but some versions need not be limited to, the following components:

1. Snapshot design/definition
2. Design definition of meta-data to be associated with the snapshot in the snapshot artifact
3. Design and implementation of a database that can accommodate snapshots and their meta-data
4. Design and implementation of security and governance policies around creation and usage of snapshots
5. Design and implementation of tools for viewing and analyzing snapshots textually and graphically.
6. Design and implementation of a collaboration system for snapshots to allow for sharing, rating, tagging and annotating.
7. Design and implementation of an export mechanism to select and export snapshots into common data formats such as HTML, XML, Excel and CSV files, variations and evolutions thereof, and other file formats as they may be defined from time-to-time.
8. Design and implementation of data visualization software to visualize snapshots
9. Design and implementation of a snapshot management system for system administrators to configure and manage snapshots.

The term "snapshot artifact" as used herein expressly refers to a data record with individually accessible data fields that include: a timestamp indicating an instant in time that the snapshot is taken; a unique identifier uniquely indicating, to a mashup server, the service id or mashup id used by the mashup server with the input data to invoke the mashup or service that generated the output data at the time indicated by the timestamp; copy of the input data supplied from the mashup server to the service or mashup that generated the output data at the timestamp time; copy of the output data obtained from the service or mashup and provided (e.g., displayed) to the user (and that caused the user to request the snapshot) at the timestamp time; and snapshot meta-data (system generated) and user meta-data (user entered meta data). Snapshot meta-data can include a description, searchable tags, and additional visualization configuration information to instruct the mashup how to visualize the data in the snapshot. User meta-data can include a user-input description and searchable tags.

Features of a snapshot device, method and system can include but need not be limited to:

1. Capture and save a snapshot at any time upon request by the user.
2. Schedule automatic snapshot captures—one time or a periodic/repeating (e.g., every x hours, or y days, weekly on d day of the week) until mm/dd/yy.
3. Select and delete one or more snapshots depending on user permissions.
4. List available snapshots for a given service/mashup.
5. Share a snapshot with another user(s), group(s), all registered users, anonymous as a mashlet, as an URL (to HTML, CSV, XML, JSON, and the like, and variations and evolutions thereof).
6. Show shared snapshots: snapshots I have shared, and snapshots that others shared with me.

7. Given a user(s), get all the snapshots created by that user(s).

8. Given a user(s), get all snapshots shared by the user(s), grouped by sharing (user-user, user-group, user-everyone, user-anonymous).

9. Given a group, get all the snapshots shared with that group.

10. Policy/entitlements definitions for security can include but need not be limited to:
   1. Snapshots feature as an entitlement that can be granted to a user or a group or to all registered users of the system.
   2. Specify the snapshot limit: how many snapshots per service.
   3. Specify sharing options: Can share, cannot share.
   4. How long are the snapshots stored: permanently or specific duration.
   5. At the time of service/mashup registration, ability to specify if the service is "snapshottable".
   6. Can/cannot export a snapshot.

11. Ability to export snapshot into several output formats including, but not limited to HTML, XML, JSON, CSV, Excel, and the like, and variations and evolutions thereof.

12. Event generation based on snapshot data (e.g., watch for certain conditions and generate a notification).

13. Annotate the snapshot with user comments and information/knowledge about data, thereby to enrich the snapshot data for later use.

14. Annotate the snapshot with micro-formats (hCard, hCalendar, Twitter #hashtags, and the like, and variations and evolutions thereof).

15. Generate usage and trends based on annotations above.

For example, a selectable snapshot button or camera icon or the like can be provided as an indication to instruct the mashup to take a snapshot, so that a user can click on the snapshot button or camera to capture some of the current information (also referred to as components) in a mashup which is being displayed on the user's screen at the current time. A user can click on the camera (or other button) to indicate that a snapshot is to be taken, and can click on any of the currently displayed mashups on a screen to take a snapshot. Other appropriate means of indicating that a snapshot is to be taken can be used.

In a mashup, for example, PRESTO brand software (available from JackBe Corporation), the mashup application allows a user to collect live data (components) from different sources, and optionally to combine them. Content within the mashup describes how the components that are collected are to be combined. What the snapshot does is capture the actual live data at that moment in time.

Each snapshot can be individually stored and can have a separate unique identifier. The unique identifier for a particular snapshot can be the timestamp and the set of inputs that the user provides to go to the mashup snapshot interface (e.g., today's date and "NASDAQ stock exchange" and "customer's account ID").

The snapshot thus can be captured and stored. It may later be retrieved.

Since the snapshot is data, the user can do many things with it. The snapshot itself is an artifact that can be controlled by a mashup.

Consider stocks, for example. There are many different web services which can be invoked to provide a list of stocks for highest gains today, for example, as well as other services. A user might want to invoke this service periodically, e.g., top gainers once an hour. A tracking mechanism in the system can specify which data source (e.g., the web service), and what data (e.g., top gainers for the date). The system can be defined to take snapshots of only this data (out of the components provided by the data source) on a pre-defined periodic interval.

That is, instead of storing data of the entire snapshot, the data is narrowed down to the exact data within a snapshot. Then, that data can be combined with other trend tracking data from another user. Consequently, there can be an automatic mechanism to collect data and then combine it.

Whereas a mashup snapshot is a complete data set for that mashup that came back from the service, a trend-tracking data can be a small portion of the mashup snapshot which was marked for trending. Instead of capturing hundreds of snapshots, it is much more manageable to just capture specific trend data within each of the snapshots.

The system can interact with the user to determine what trend data (attribute) is to be captured, for example, which particular stock symbol and percent of change. The user can specify the periodicity of the tracking.

A separate database can be provided for storing snapshots (live data), which can be different from the database for storing the trend data. The identifying factors for these artifacts can be timestamp, user, and inputs provided by the user. This conveniently can be a relational database.

Note that mashups do not hold on to data—they just provide live data. The system uses the live data which is provided to the mashup. Consequently, the data which is captured is much higher quality than standard data extraction and data dump provided by conventional systems. Also, the user can select the data in which he is interested, instead of a large-scale dumping of entire data sets. Another problem with typical batch data is that it is no longer live.

The trend analysis can be provided as a feature of a mashup.

One or more aspects are now described with respect to examples illustrated in the figures.

Referring now to FIG. 1, a block diagram illustrating a collection of snapshots used for trend analysis will be discussed and described. In FIG. 1, there is one or more users 101, a snapshot record 113a-c generated when the user 101 captures 111 a snapshot of a mashup running a service or of the service itself. The snapshot record 113 includes a snapshot ID 115, a timestamp 117, a mashup ID 119 (if a service, is a service ID), input data 121, data received from the mashup (or service) 131-137, snapshot meta-data 141, and user meta-data 151. The snapshot record 113a-c can be stored in a snapshot database 151 along with other snapshot records 113a-c or snapshot artifacts. The data received from the mashup is represented here by mashed data 131, and data 1-data n 131,135, 137; if the trend being tracked is in a service, the data received from the service.

In FIG. 1, the snapshot ID 115 can be a unique identifier, to uniquely identify different snapshots, generated by the system at the time of capturing the snapshot. The timestamp 117 can be recorded for historical and reporting reasons. For example, when there is a collection of snapshots, a user may want to limit to a begin/end time.

The mashup ID 119 can identify a unique identifier of the mashup from which the snapshot was taken. The mashup ID 119 can be generated according to known techniques. If the trend is being taken for a service, then a known service ID can be used instead of the mashup ID. For example, conventions provide that when the service 105 is published into a mashup platform, the mashup platform automatically generates the service ID which can be used anytime that service is recalled for the user. When a system has the unique ID, the system can perform service invocation and can retrieve other information about the service. Publishing a service ID or mashup ID 119 is a known technique, e.g., as provide in PRESTO brand mashup software.

The system can capture the information the user enters for the service as the input data 121, and the information provided most recently by the service 105 as the mashed data and data 1-*n* 131-137. Input data can be omitted or not stored within the snapshot artifact 113, depending on what the mashup requires to execute the data. Some services are predefined to not have any inputs. In other cases, the service is predefined to require inputs. For example, to get the stock report record from a stock report data service, the stock symbol and date is needed to retrieve the price. If there is input data, the snapshot record 113 stores the input data 121 that the user provided most recently to invoke the mashup 105 by the time of requesting the snapshot 111. So, when a snapshot is taken of the data at that point, in this example the data 131 is the stock price, and the input data 121 is the date and the stock code.

Data 131-137 stored in the snapshot record 113 is the actual data from the data source via the service that is captured, and which the user selected as specific data elements to be analyzed. In the above example, data 1 133 is the stock price and the user selected the stock price for this particular stock. Whatever the service returns after being invoked, the stock price data element in the data 1 133 returned by the service (or mashup) is stored in the snapshot record.

The snapshot record 113 can store meta-data, which can conveniently be divided into two different meta-data: snapshot meta-data 141 and user meta-data 151. The metadata in the snapshot record 113 can be things like category, tag, comment or description provided by user, and similar variations. The meta-data can be user input, or can be derived from existing data.

Snapshot meta-data 141 are intended to be things that the system generates and stores along with the snapshot information, such that the snapshot meta-data 141 is related to the snapshots in a manner that the 101 can later retrieve the snapshot in a user-friendly manner (e.g., by searching, by listing, and the like).

User meta-data 151 are intended to be information about the user that performed the operation, or user comments about specific data within the snapshot element, and the like. If the system stores a snapshot artifact 113, the system can store who took the snapshot, e.g., user ID, etc. The user meta-data 151 can be user input. Consider, for example, that the user 101 uses the service 105 to get all stock prices by Apple for the week, and the user 101 wants to add a comment to the Wednesday data. In one embodiment, the user meta-data 151 can be annotations on top of the snapshot, especially with regard to elements within the data. The user meta-data 151 might indicate, "select $5^{th}$ row and add my annotation" plus the user text annotation.

There are some subtle differences between user meta-data and snapshot meta-data that relate to the intended use of the meta-data. The system can interrogate the user 101 when the user takes a snapshot; this can be stored as snapshot meta-data 141. As another example, if a user 101 wants to say something about the mashed data, the user can enter a text comment and that can be stored in the snapshot artifact 113 as user meta-data 151.

All of the snapshot records 113*a-c* can be stored into the snapshot database 153. For example, each snapshot record 113 can be stored as a separate record in the snapshot database 153. Any conventional database can be used as the snapshot database 153, for example, a conventional hierarchical database.

In FIG. 1, the mashup is invoked through the mashup server (discussed further below) in accordance with known techniques. The mashup into which the user 101 is inputting data was previously published according to conventional techniques inside a mashup platform, for example, within the mashup server. Consider for example that there is a web service, which was previously published in the mashup platform. Once it is published, the service is exposed to the user either through a user interface (UI) or an application program interface (API), in accordance with known techniques. When the user 101 sees the service on the UI or API, it can be invoked through the mashup server. The request to trend-track the data currently displayed along with the input data, is sent from the user's computer to the mashup server; the mashup server can look up the mashup ID (or service ID) from the invocation of the mashup (or service) from the mashup repository (as is conventionally known). When the user 101 sees the data from the mashup or service displayed on the display, the user has already invoked that service.

The fact that the mashup or service is invoked means that the mashup server already has the currently displayed data and is temporarily buffering (e.g., caching in local memory) the input data from the user 101 and the live data from the mashup or service.

The user can interact with the mashup client/server to select a specific mashup or service data and specific data elements within the mashup or service data to analyze, for example by using a menu or an interface to point and select data elements. Also, the user can interact with the mashup client/server to input parameters defining the trend tracking, including a pre-determined periodic time interval when the mashup or service data is to be collected. Optionally, the trend-tracking definition can include a start and/or stop time. The specific data elements (that is, data fields) within the mashup or service data to be analyzed are also stored in the trend-tracking definition. The trend-tracking definition can be stored with the snapshot records and other snapshot artifacts in the snapshot database 153.

The expiration of the pre-determined periodic time interval triggers the mashup server to invoke the mashup (or service) and to save the most recent data 131-137 from the mashup or service and the most recent invocation data (input data 121). Basically when the user 101 takes a snapshot record, the user is taking a snapshot of the last invocation input data and data from the mashup or service. The request for the trend-tracking sent to the mashup server can cause the mashup server to save the input data 121 and data 131-137 as part of the snapshot record 113, e.g., as a record stored into the snapshot database 151. One snapshot record 113*a-c* is created and stored, with snapshot ID 115, timestamp 117, mashup ID 119, input data 121, data 131-137, snapshot meta-data 141 description, and user meta-data 151 annotations, for each pre-determined periodic time interval.

From the user perspective, the user might not even be aware whether it is a service or a mashup that is providing the data that the user captures. The implementation can be the same for snapshots and mashups. The same snapshot database 153 can be used for services and mashups.

As stated above, for the mashup snapshot record 113*a-c* it is a mashup ID 119 that is stored instead of a service ID. The mashup snapshot record 113 goes into the same database as the service snapshot record. The mashup snapshot record 113 has mashed data, data 1, data 2, and data n 131, 133, 135, 137. Recall that the mashup can combine data from different data sources and/or mashups, according to known techniques, to form mashed data. As is conventional, the mashup produces a mashup result, which is conventionally provided to the user of the mashup: mashed data, data 1, data 2, and data n. The mashed data 131 can be stored in the snapshot record 113a-c as well as the original source data (data 1, data 2, data n) 133, 135, 137 to see what was used in building the mashed data 131. Also, the snapshot record 113a-c can store an indication of the visualization techniques used by the data 131, 133, 135, 137 to be visualized, so that the snapshot meta-data can be retrieved and presented in the same visualization technique as used to originally present the data.

The pre-determined time interval can be typical calendar scheduling, e.g., interval, duration, etc. The system can interact with the user to pre-define the periodic interval for taking additional snapshots. The system can execute the snapshot on behalf of the user even if the user is not logged in, for example by periodically executing the service (or mashup) to obtain the data which can be stored in successive snapshots, one for each periodic interval.

Figure 2:
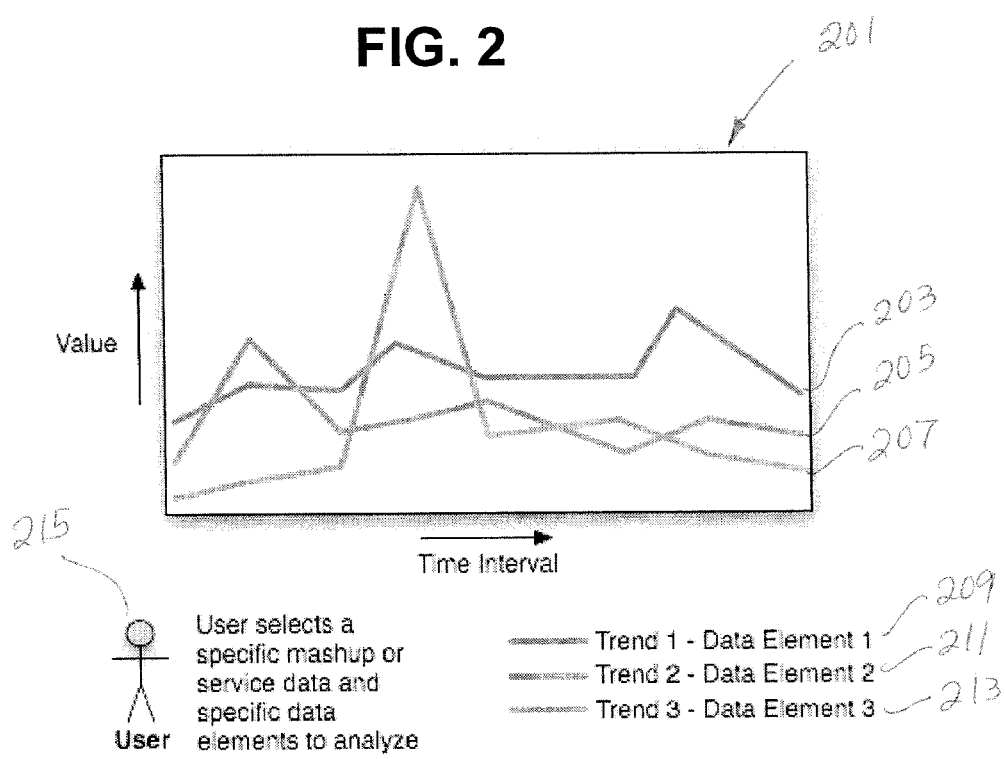
FIG. 2 is a graphical illustration of trend analysis.

Referring now to FIG. 2, a graphical illustration of trend analysis will be discussed and described. In this illustration, a trend chart 201 with three trend lines 203, 205, 207 corresponding to data element 1 209, data element 2 211 and data element 213 (over time) are representative of various pre-selected data elements on which a trend is analyzed. The trend chart 201 is representative of any known technique used to analyze data trends. A user 215 might wish to track a trend shown over time by mashups, and as explained further herein can do so by collecting only the data that is of interest and omitting the other data in the mashup.

For example, consider stocks. In a first situation, when the user 215 requests a list of stocks and their prices, and e.g., the lowest price for the day and instructs the system to capture this information over a period of time, the user 215 might be interested only in certain elements in the data such as highest price. The user 215 may want to show how a highest price for a particular stock moved for a day or week. The user may want to select a narrower set of data elements from the mashup and make a trend out of it over time.

In a second situation, a user 215 has been taking and storing mashup or service snapshots over a period of time, and the user 215 later realizes they want a trend analysis on a particular subset of data from the stored mashup or service snapshots. That is, the user has been taking and storing snapshots and then realized a desire to do a trend analysis on the already-stored snapshot records. In the second situation, the user started out with no intention to capture the data for a trend analysis. In the first situation, the user is creating the snapshot definition and the trend definition together. There are two different user cases.

Consider the second situation, in which a user has already created snapshots and wants to do trend tracking. Trend analysis in general happens on a collection of data, and has a start and end time. When the user is browsing snapshots on, e.g., budgets with budget data, and then wants to run an analysis on how much money spent on a particular budget item, e.g., computer equipment, the user can retrieve and display the snapshot and indicate to the system those elements that represent money spent on buying computers. The system captures the interest of the user, e.g., "please select one or two data elements in the current snapshot." Then the user can do a trend analysis on the transaction amount. Creating a request to do a trend interacts with the user to specify the subset of the data in the mashup or service on which the user wishes to do the trend.

Figure 3:
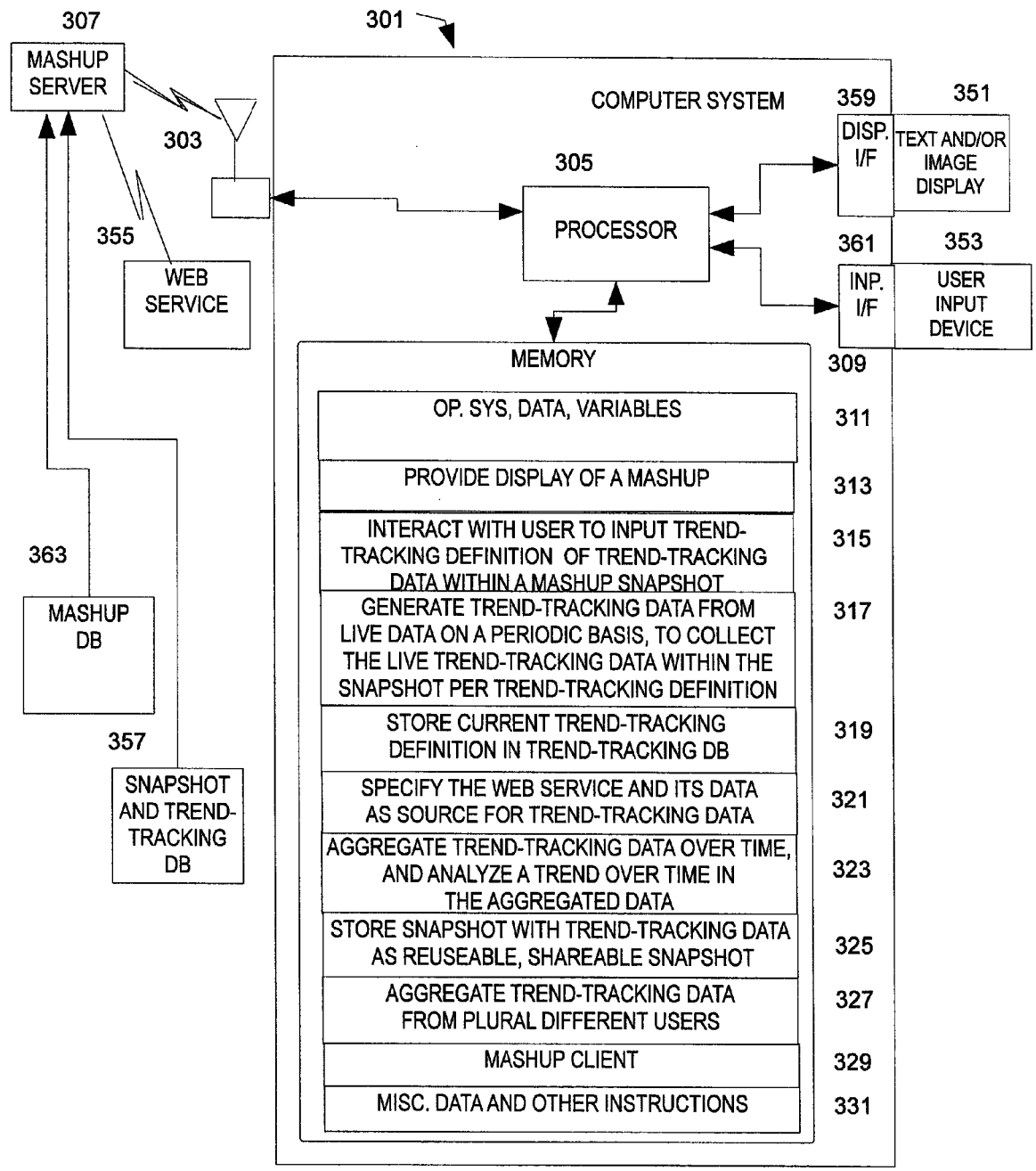
FIG. 3 is a block diagram illustrating portions of an exemplary computer system for snapshots.

Referring now to FIG. 3, a block diagram illustrating portions of an exemplary computer system for snapshots will be discussed and described. The computer system 301 may include a communication port and/or transceiver 303 or the like for communication with a mashup server 307, a processor 305, a memory 309, a display interface 359, a display 351, an input interface 361, and/or a user input device 353 such as a keyboard.

The mashup server 307 can be a part of a mashup platform comprising the mashup server 307 and a mashup client 329 which can execute on the processor 305 of the computer system 301. Mashup server and mashup client functions can be distributed between the mashup server 307 and the mashup client 329 according to known techniques. The mashup server 307 can invoke one or more web services 355 as is known to obtain data from data source. Also, the mashup server 307 can access a snapshot and trend-tracking database 357 on which snapshot artifacts, snapshot records, and trend-tracking definitions are stored, as is further described herein.

The processor 305 may comprise one or more microprocessors and/or one or more digital signal processors. The memory 309 may be coupled to the processor 305 and may comprise a read-only memory (ROM), a random-access memory (RAM), a programmable ROM (PROM), and/or an electrically erasable read-only memory (EEPROM). The memory 309 may include multiple memory locations for storing, among other things, an operating system, data and variables 311 for programs executed by the processor 305; computer programs for causing the processor to operate in connection with various functions such as providing 313 a display of a mashup and/or a service, interacting 315 with a user to input a trend-tracking definition of trend-tracking data within a mashup snapshot, generating 317 trend-tracking data from live data on a periodic basis, storing 319 the trend-tracking definition in a trend-tracking database 357, interact 321 with the user to specify the web service and its data as a source for trend-tracking data, aggregate 323 trend-tracking data over time and analyze a trend over time in the aggregated data, store 325 a snapshot record with trend-tracking data, aggregate 327 trend-tracking data from plural different users, a mashup client function 329, and/or other processing; and a database 331 for other information used by the processor 305. The computer programs may be stored, for example, in ROM or PROM and may direct the processor 305 in controlling the operation of the computer system 301. Each of these functions is considered in more detail below.

The user may invoke functions accessible through the user input device 353, interface with the processor 305 through an input interface 361. The user input device 353 may comprise one or more of various known input devices, such as a keyboard and/or a pointing device, such as a mouse; the keyboard may be supplemented or replaced with a scanner, card reader, or other data input device; the pointing device may be a mouse, touch pad control device, track ball device, or any other type of pointing device; and the input interface 361 can be a known interface thereof to communicate with the processor 305.

The text and/or image display 351 is representative of a display that may present information to the user by way of a conventional liquid crystal display (LCD) or other visual display, and/or by way of a conventional audible device for playing out audible messages.

Responsive to signaling from the user input device 353, in accordance with instructions stored in memory 309, or automatically upon receipt of certain information via the communication port and/or transceiver 303, the processor 305 may direct the execution of the stored programs.

The processor 305 can be programmed for providing 313 a display of a mashup and/or a service, such as is performed according to known techniques when a user invokes a service or a mashup. As is known, the invocation of the mashup or service is performed via the mashup platform which comprises the mashup client 329 and the mashup server 307, sometimes requiring the system to interact with the user to input data and select a service or mashup via the user input device 353 and/or display 351, resulting in the mashup or service displaying data generated by the serv34 355 which is provided for the display 351.

The processor 305 can be programmed for interacting 315 with a user to input a trend-tracking definition of trend-tracking data within a mashup snapshot. Optionally, the user may be interrogated or prompted to provide additional snapshot meta-data and/or user meta-data.

The processor 305 can be programmed for interacting 515 with a user select a mashup and/or service to use for trend-tracking, and to define which data elements with in the mashup and/or service are to be tracked, and to define the input data which is to be input to the mashup and/or service.

The processor 305 can be programmed for generating 317 trend-tracking data from live data on a periodic basis, by periodically, at a pre-determined interval, invoking the mashup or service with the input data (provided when the trend-tracking definition was initially set up) via the mashup server 307. The processor 305 thus can periodically collect the live trend-tracking data within the snapshot defined by the trend-tracking definition. For example, the mashup or service can return a record (with current data) generated by the service or mashup in response to the input data. The trend-tracking definition defines, among other things, one or more data elements within the record returned by the mashup or service. The value at the specified data element (or the entire record) is stored in the snapshot record in the snapshot and trend-tracking database 357. When plural values for the data element are collected over time, they can be analyzed for trends.

The trend-tracking data (the data that is collected for the trend analysis) can be stored in the same snapshot database 357 (as illustrated), or can be stored in a database separate from the snapshots. Also, the trend definition (what the user wants to do for a trend) may conveniently be stored together with the snapshot artifact. However, the trend data and/or the trend definition do not have to be in the same database as the snapshots and/or snapshot artifacts. Nevertheless, in one embodiment where the trend data is stored as a snapshot record, it can be advantageous to store the trend data in the snapshot and trend-tracking database 357.

The scheduling definition for periodic snapshots can be stored with the snapshots also. Schedule definitions, trend definitions, can all conveniently be stored in the same snapshot repository.

The identification key for a collection of trend-tracking data can be a system generated unique ID for a trend definition, e.g., based on the request itself and/or any user input. The unique ID can be generated using various known techniques. For example, the user can enter a user label for the trend, e.g., "Trend Analysis of Apple Stock", which can be a title for the trend and may be used to identify the trend to the user.

To use less storage, the trend-tracking data may collect only a subset of the snapshot data. More particularly, internally, the system can be taking snapshots, e.g., once a day of Apple's high stock price. That one piece of data can be stored within a snapshot, but service-provided data that is not requested to be tracked is not stored. Note, conventional access to the service is atomic, meaning that a user can specify and obtain detail information from within a record. E.g., a stock quote request for Apple stock can return one record including today's highest and lowest price and volume, etc.

The snapshot and trend tracking database 357 can store only the high stock price data (which is the trend data in this example) from the record and omit the other information returned from the service/mashup. The determination of which data to store is made from the trend definition. Note, regardless of how much data (single piece of data or multiple pieces) is stored, it can conveniently be stored as a snapshot record which has a format to the database identical to the snapshot artifact.

The trend-tracking definition defines the trend to be taken, the web service or mashup, the data element of interest returned by the web service or mashup, and the periodicity of invocation. The web service or mashup can be periodically invoked by the system (e.g., mashup server) as defined in the trend-tracking definition to collect and store the data. If the web service has been published, the mashup server can call the web service, or call the mashup that will call the service. From a user perspective, whether it is a service or mashup looks the same.

The processor 305 can be programmed for storing 319 the trend-tracking definition in a trend-tracking database 357. The request for the trend can be stored as a trend-tracking definition in a database. The trend-tracking definition may be stored together with or separately from the snapshot.

Consequently, the processor 305 can be programmed to interact 321 with the user to specify the web service and its data as a source for trend-tracking data. A user interface may be provided over the display interface 359 which provides visual information to the user over the text and/or image display 351, and which receives input from the user supplied by a user input device 353 via an input interface 361.

The processor 305 can be programmed to aggregate 323 trend-tracking data over time and to analyze a trend over time in the aggregated data. The processor 305 thus can interact with a user or can retrieve records from the snapshot and trend-tracking database 357 based on a specified trend-tracking definition, user identifier, web service/mashup, data element, periodicity of trend-tracking, and/or start/stop times. Conventional techniques can be applied in order to analyze the collected trend data.

Also, the processor 305 can be programmed to store 325 a snapshot record with trend-tracking data, as discussed above. The trend-tracking data can be re-usable, that is stored for later retrieval and usage (in contrast to a temporary data buffer). In addition, the stored data can be shared as a snapshot, for example, by sending a link to the snapshot from one user to another user, whereby the link allows the other user to retrieve the snapshot record from the snapshot and trend-tracking database 357.

The processor 305 can be programmed to aggregate 327 trend-tracking data from plural different users. That is, the trend-tracking data which is aggregated in order to analyze a trend over time can be from different users and need not be limited to the user that defined the trend. For example, different users can take snapshots over the course of time, so that snapshot artifacts are stored; or different users can set up different trend-tracking definitions which store snapshot records over the course of time. It is possible that the users may decide to collaborate and want to aggregate their different snapshot artifacts and/or snapshot records for an analysis. Thus, the processor 305 can retrieve records from the snapshot and trend-tracking database 357 based on plural user identifies, in addition to a specified trend-tracking definition, web service/mashup, data element, periodicity of trend-tracking, and/or start/stop times. The aggregated data can be used for an analysis.

The processor 305 can be programmed with a mashup client function 329, in accordance with known techniques. That is, the mashup platform can be distributed between the mashup server 307 and the mashup client 329, as is known. Details which are not presently relevant are omitted from the present description.

The computer system 301 can include a central processing unit (CPU) with disk drives (not illustrated), symbolic of a number of disk drives that might be accommodated by the computer. Typically, these might be one or more of the following: a floppy disk drive, a hard disk drive, and a CD ROM or digital video disk. The number and type of drives may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external.

It should be understood that FIG. 3 is described in connection with logical groupings of functions or resources. One or more of these logical groupings may be omitted from one or more embodiments, for example, the functionality of analyzing a trend over time in the aggregated data can be omitted and/or performed on a different processor. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope of the invention.

Figure 4:
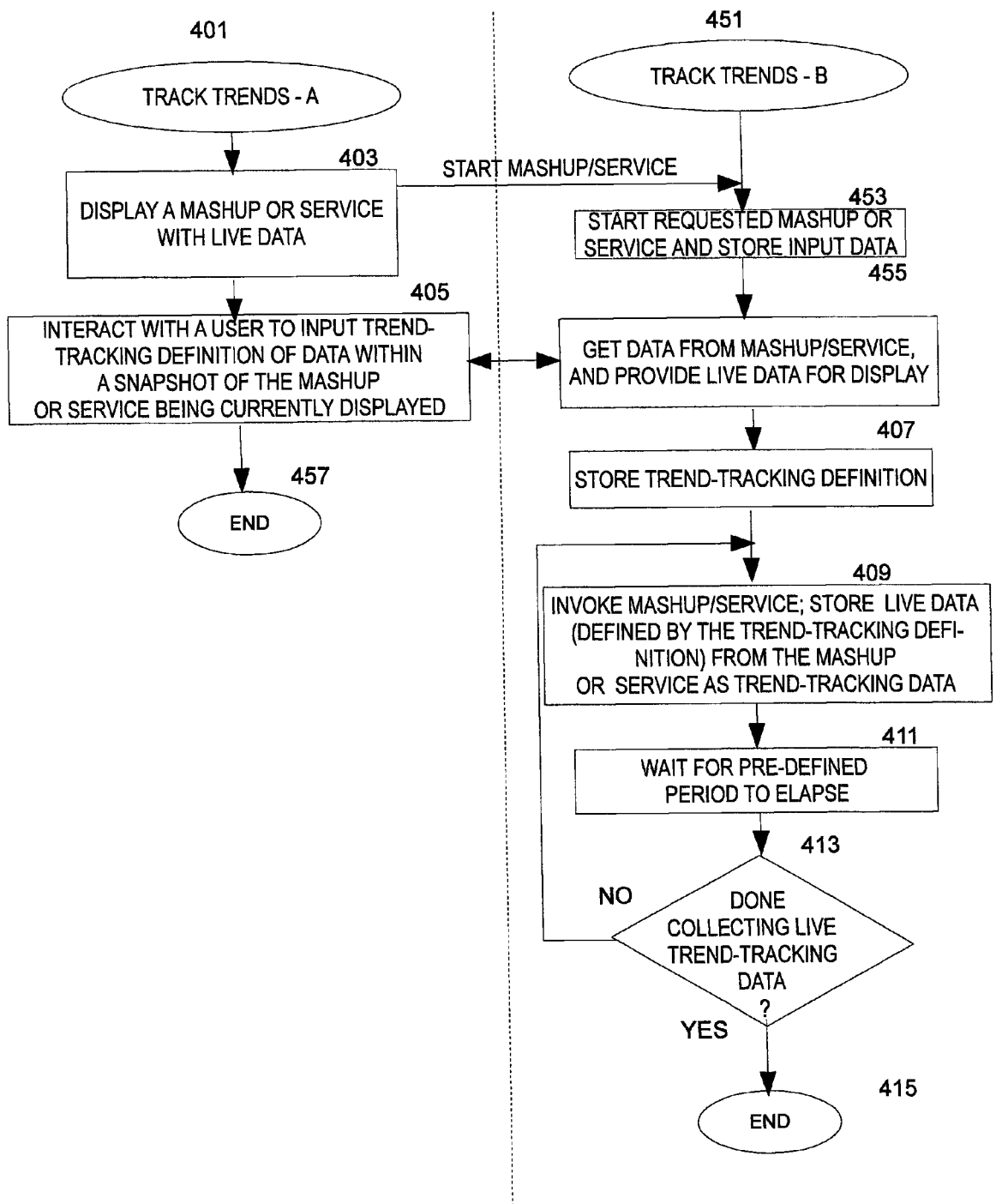
FIG. 4 is a flow chart illustrating a procedure to track trends in mashup data.

Referring now to FIG. 4, a flow chart illustrating a procedure to track trends in mashup data will be discussed and described. The procedure can advantageously be implemented on, for example, a processor of a computer system, optionally together with a mashup server, such as described in connection with FIG. 3 or other apparatus appropriately arranged.

In overview, the procedure to track trends conveniently can be distributed in two flows, the first flow track trends-A 401 as a user application and the second flow track trends-B 451 as a background process.

The first flow 401 can include displaying 403 a mashup or service with live data, according to known techniques. The first flow 401 can include interacting 405 with a user to input a trend-tracking definition of data with a snapshot of the mashup or service being currently display, in order to define the trend-tracking data. Also, as explained above, the trend-tracking definition can include the periodicity that the data is measured (or retrieved from the mashup or service).

The second flow track trends 451 can include, in response to a request to display a mashup or service, starting 453 the requested mashup or service and storing the input data (if any) which was used as an input parameter to the mashup or service and which presumably represents the live data that the user wishes to retrieve from the mashup or service.

Then the second flow track trends 451 can get 455 the live data from the mashup or service and provide the live data for display, in accordance with known techniques.

Further, the process can store 407 the trend-tracking definition, so that it can be referenced for obtaining the trend-tracking data from time-to-time, as pre-defined therein. Having obtained the trend-tracking definition, the process is ready to periodically obtain and store current live data from the mashup or service defined in the trend-tracking definition.

Having the trend-tracking definition, the process can invoke 409 the mashup or service specified in the trend-tracking definition (as explained above), and store the live data (e.g., the data element in the record obtained from the mashup or service) as trend-tracking data which can later be aggregated and used to analyze for trends over time.

Then, the process can wait 411 for the pre-defined period of time (provided in the trend-tracking definition) to elapse. After the per-defined period of time elapses, the process can check 413 whether it is done collecting live trend-tracking data, for example if the trend-tracking definition specifies a stop date/time. If the process is not done collecting live trend-tracking data, then the process can loop to invoke 409 the mashup/service, store the live data, and so forth as explained above However, if the process is done collecting the trend-tracking data 415, then the process can end 415.

Figure 5:
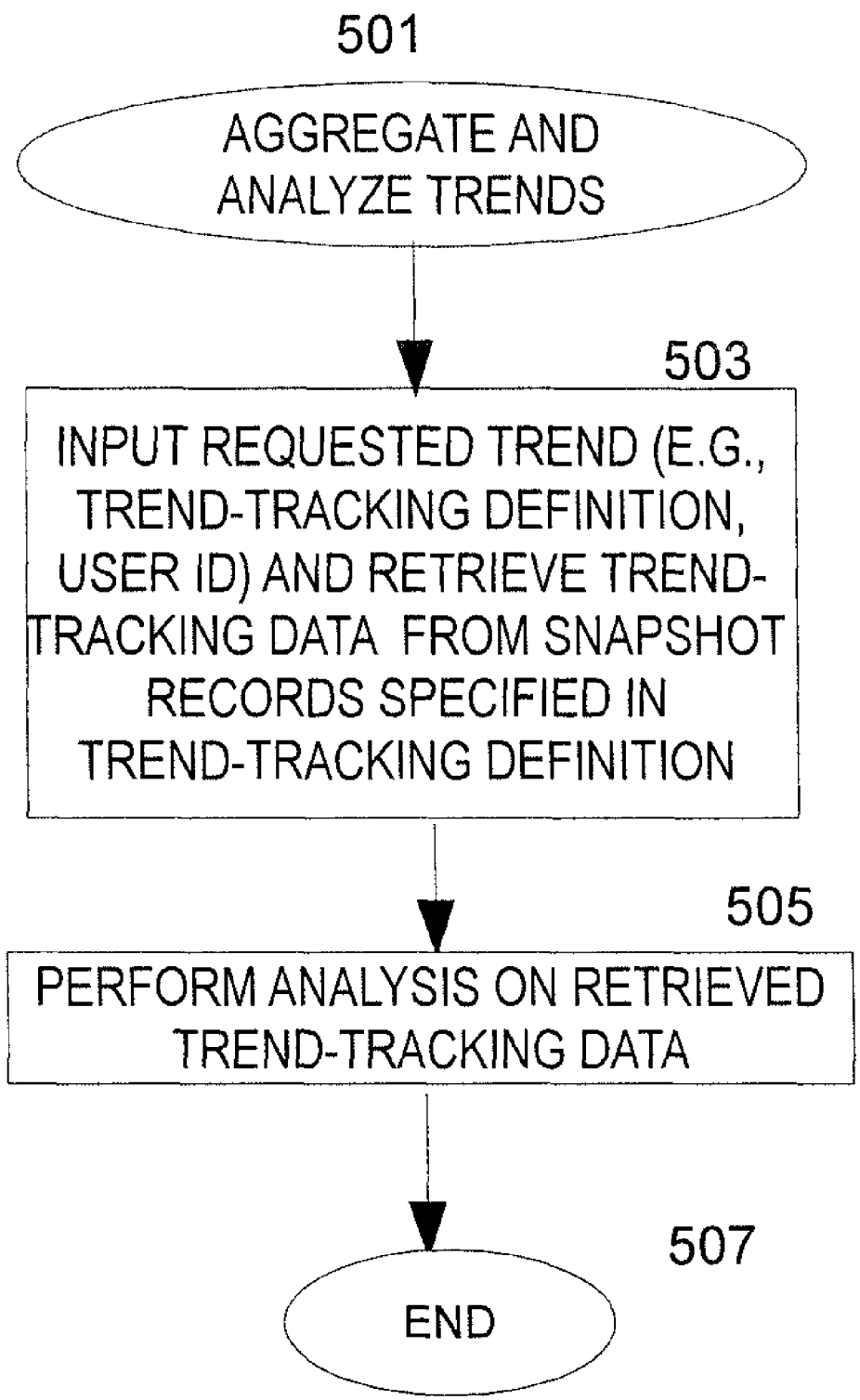
FIG. 5 is a flow chart illustrating a procedure to aggregate and analyze trends.

Referring now to FIG. 5, a flow chart illustrating a procedure to aggregate and analyze trends is discussed and described. The procedure can be implemented on, for example, a processor of a computer system such as described in connection with FIG. 3 or other apparatus appropriately arranged.

The procedure 501 to aggregate and analyze trends in this example assumes that a trend-tracking definition was previously created and stored, and that snapshot records or snapshot artifacts have been stored because of the trend-tracking definition.

The procedure 501 can input 503 a requested trend and retrieve the corresponding trend-tracking data from snapshot records specified in the requested trend. The trend which is to be analyzed can conveniently be specified by the user ID and the trend-tracking definition initially input by the user. Alternatively, the trend can be identified by its other parameters, such as mashup or service ID, periodicity, and/or data element. The procedure 501 can default to the user ID of the current user; alternatively, one or more other user IDs can be specified and trend-tracking definitions can be retrieved corresponding to those user IDs (for example, if appropriate permissions are present). Alternatively, plural trends can be requested so that the data which is to be analyzed is from the plural trends.

The data which is retrieved can be returned in any appropriate form, such as a data record.

Then, the process can perform 505 an analysis on the retrieved trend-tracking data. Any analysis can be performed according to known techniques, such as various conventional trend analyses, for example, regression analysis, chi-square analysis, line graphing, bar graphing, pie charts, other analyses, and the like.

When the process 501 has performed the analysis, it can end 507.

The above description frequently deals with one user. However, consider for example a collection of users such as a group of financial analysts. In the collection of users, different users can retrieve and display different data in different points of time, taken as snapshots by different people, for the same service. The snapshots can be aggregated over time. For example, consider three stock analysts looking at the same stocks on different days. A mashup can include a financial reporting service and displays a full range of stocks. However, the three stock analysts take snapshots of the same selected stocks on different days. The snapshots from different users of the same components of the service can be shared and even tracked.

The term "mashup" is used to refer to a software application that combines pre-existing components from one or more information-providing services into a single tool which can comprise a server-side and a client-side application, where the components used by the mash-up are visually presented to a user on a display at the client-side in a manner which is different from the pre-determined presentation of the information-providing service. A mashup is frequently made by access to open APIs and other data sources to produce results that were not the original reason for producing the raw source data. An example of a mashup is the use of cartographic data from Google Maps to add location information to real estate data, thereby creating a new and distinct Web service that was not originally provided by either source. A "mashup", as the term is used herein, is expressly defined as being configured in accordance with mashup standards such as XML interchanged as REST (REpresentational State Transfer) or Web Services, RSS, Atom, and other evolutions and variations of mashup standards, or extracting data from a screen display output of a program on another site; but excluding simply linking to another site, such as through an HTML href. A mashup is to be distinguished from a portal in which content is presented side-by-side in the manner that is the same as the pre-determined presentation of the information-providing service.

The term "service" is used herein expressly to refer to an information-providing service that provides data from a server in a visual presentation on a display to a user, typically an application programming interface (API) or web API that can be accessed over a computer packet network and executed on a remote system hosting the requested services, in accordance with Extensible Markup Language messages that follow the Simple Object Access Protocol (SOAP) standard, Web Services Description Language (WDSL), Representational State Transfer (REST) constraints, and variations and evolutions thereof. An example of a service is Google Maps, a Web service or an RSS feed.

The term "component" as used herein refers to data that is retrieved in real-time from an information-providing service.

The detailed description herein includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

As one example, the computer system may be a general purpose computer, or a specially programmed special purpose computer. It may be implemented as a distributed computer system rather than a single computer. Similarly, a communications link may be World Wide Web, a modem over a POTS line, and/or any other method of communicating between computers and/or users. Moreover, the processing could be controlled by a software program on one or more computer system or processors, or could even be partially or wholly implemented in hardware.

One or more displays for the system may be provided in connection with HTML display format. Although HTML is the preferred display format, it is possible to utilize alternative display formats for interacting with a user and obtaining user instructions.

The above discussion has involved particular examples. However, the principles apply equally to other examples and/or realizations. Naturally, the relevant data may differ, as appropriate.

Further, the above has been discussed in certain examples as if it is made available by a provider to a single user with a single site. The above described system, device and/or method may be used by numerous users over distributed systems, if preferred.

The above has been described in connection with example data formats, for example XML and/or proprietary or public formats. However, it may be used in connection with other data formats, structured and/or unstructured, unitary and/or distributed.

The system used herein may rely on the integration of various components including, as appropriate and/or if desired, hardware and software servers, applications software, database engines, server area networks, firewall and SSL security, production back-up systems, and/or applications interface software. The configuration may be, preferably, network-based and optionally utilizes the Internet as an exemplary primary interface with the user.

The various databases may be in, for example, a relational database format, but other standard data formats may also be used.

It should be noted that the term "computer system" used herein denotes a device sometimes referred to as a computer, laptop, personal computer, personal digital assistants, personal assignment pads, or equivalents thereof provided such units are arranged and constructed for operation with a mashup or service.

Furthermore, the communication networks of interest include those that transmit information in packets, for example, those known as packet switching networks that transmit data in the form of packets, where messages can be packetized and routed over network infrastructure devices to a destination. Such networks include, by way of example, the Internet, intranets, local area networks (LAN), wireless LANs (WLAN), wide area networks (WAN), and others, and can be supported by networking protocols such as TCP/IP (Transmission Control Protocol/Internet Protocol) and UDP/UP (Universal Datagram Protocol/Universal Protocol) and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system, comprising:
a display interface;
a user input device interface; and
a processor cooperatively operable with the display interface and the user input device interface, and configured to facilitate:
displaying, via the display interface, a mashup or service,
interacting with a user to input, via the user input device interface, a trend-tracking definition of trend-tracking data within a snapshot of the mashup or service being currently displayed via the display interface, and
generating the trend-tracking data from live data within the service or mashup on a pre-defined periodic basis, to collect the live trend-tracking data within the snapshot as defined by the trend-tracking definition.

2. The computer system of claim 1, further comprising storing the trend-tracking definition in a trend-tracking database.

3. The computer system of claim 1, wherein the trend-tracking definition includes a specification of a web service and which trend data available from the web service, to use as a source for the trend-tracking data.

4. The computer system of claim 1, further comprising aggregating the trend-tracking data over time, and analyzing a trend over time in the aggregated trend-tracking data.

5. The computer system of claim 1, further comprising storing the snapshot with the trend-tracking data as a reusable and shareable snapshot in a snapshot database.

6. The computer system of claim 1, further comprising aggregating the trend-tracking data from plural different users.

7. The computer system of claim 1, wherein the trend-tracking data is stored in the snapshot database within a snapshot and includes a timestamp, service or mashup identifier used for the mashup, copy of input data supplied to the mashup or service, copy of the trend-tracking data output from the mashup or service, and configuration information instructing the processor how to visualize and use the data in the snapshot.

8. A computer-implemented method, implemented on a computer system, for analyzing a trend, comprising:
displaying, at a mashup client computer via a display interface, a mashup or service,
interacting with a user to input, via a user input device interface at the mashup client computer, a trend-tracking definition of trend-tracking data within a snapshot of the mashup or service being currently displayed via the display interface, and
generating, at a mashup server computer, the trend-tracking data from live data within the service or mashup on a pre-defined periodic basis, to collect the live trend-tracking data within the snapshot as defined by the trend-tracking definition.

9. The method of claim 8, further comprising storing the trend-tracking definition in a trend-tracking database.

10. The method of claim 8, wherein the trend-tracking definition includes a specification of a web service and which trend data available from the web service, to use as a source for the trend-tracking data.

11. The method of claim 8, further comprising aggregating the trend-tracking data over time, and analyzing a trend over time in the aggregated trend-tracking data.

12. The method of claim 8, further comprising storing the snapshot with the trend-tracking data as a reusable and shareable snapshot in a snapshot database.

13. The method of claim 8, further comprising aggregating the trend-tracking data from plural different users.

14. The method of claim 8, wherein the trend-tracking data is stored in the snapshot database within a snapshot and includes a timestamp, service or mashup identifier used for the mashup, copy of input data supplied to the mashup or service, copy of the trend-tracking data output from the mashup or service, and configuration information instructing the processor how to visualize and use the data in the snapshot.

15. A non-transitory computer-readable medium comprising instructions for execution by a computer, the instructions including a computer-implemented method for analyzing a trend, the instructions for implementing:
displaying, at a mashup client computer via a display interface, a mashup or service,
interacting with a user to input, via a user input device interface at the mashup client computer, a trend-tracking definition of trend-tracking data within a snapshot of the mashup or service being currently displayed via the display interface, and
generating, at a mashup server computer, the trend-tracking data from live data within the service or mashup on a pre-defined periodic basis, to collect the live trend-tracking data within the snapshot as defined by the trend-tracking definition.

16. The computer-readable medium of claim 15, further comprising storing the trend-tracking definition in a trend-tracking database.

17. The computer-readable medium of claim 15, wherein the trend-tracking definition includes a specification of a web service and which trend data available from the web service, to use as a source for the trend-tracking data.

18. The computer-readable medium of claim 15, further comprising aggregating the trend-tracking data over time, and analyzing a trend over time in the aggregated trend-tracking data.

19. The computer-readable medium of claim 15, further comprising storing the trend-tracking data in the snapshot database within a snapshot, the snapshot include a timestamp, service or mashup identifier used for the mashup, copy of input data supplied to the mashup or service, copy of the trend-tracking data output from the mashup or service, and configuration information instructing the processor how to visualize and use the data in the snapshot.

20. The computer-readable medium of claim 15, further comprising aggregating the trend-tracking data from plural different users.

* * * * *